(12) United States Patent
Iritsuki et al.

(10) Patent No.: US 8,802,311 B2
(45) Date of Patent: Aug. 12, 2014

(54) FUEL CELL STACK STRUCTURE

(75) Inventors: Keita Iritsuki, Yokosuka (JP); Yasushi Ichikawa, Yokosuka (JP); Yuichiro Tabuchi, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1253 days.

(21) Appl. No.: 12/293,615

(22) PCT Filed: Mar. 21, 2007

(86) PCT No.: PCT/IB2007/000704
§ 371 (c)(1),
(2), (4) Date: Sep. 29, 2008

(87) PCT Pub. No.: WO2007/107860
PCT Pub. Date: Sep. 27, 2007

(65) Prior Publication Data
US 2010/0119910 A1 May 13, 2010

(30) Foreign Application Priority Data

Mar. 22, 2006 (JP) ................................. 2006-078958
Jan. 25, 2007 (JP) ................................. 2007-014855

(51) Int. Cl.
*H01M 8/24* (2006.01)
*H01M 2/40* (2006.01)
*H01M 2/38* (2006.01)
*H01M 8/02* (2006.01)

(52) U.S. Cl.
CPC .......... *H01M 8/2485* (2013.01); *H01M 8/2415* (2013.01); *H01M 8/0258* (2013.01); *Y02E 60/50* (2013.01)

USPC ........................... 429/456; 429/458; 429/459

(58) Field of Classification Search
None
See application file for complete search history.

(56) References Cited

U.S. PATENT DOCUMENTS

| | | | |
|---|---|---|---|
| 4,670,361 A * | 6/1987 | Tsutsumi et al. | 429/458 |
| 2002/0005178 A1 * | 1/2002 | Iwatani et al. | 123/41.14 |
| 2005/0064269 A1 | 3/2005 | Kurtz et al. | |
| 2005/0221159 A1 * | 10/2005 | Harada et al. | 429/38 |
| 2005/0271910 A1 | 12/2005 | Bai et al. | |
| 2008/0090130 A1 * | 4/2008 | Ichikawa | 429/38 |

FOREIGN PATENT DOCUMENTS

| | | |
|---|---|---|
| EP | 1 942 546 A1 | 7/2008 |
| JP | 2004-259637 A | 9/2004 |
| JP | 2004259637 A * | 9/2004 |
| JP | 2006172849 A * | 6/2006 |
| WO | 00/36682 A2 | 6/2000 |
| WO | 2007/049790 A1 | 5/2007 |

* cited by examiner

*Primary Examiner* — Ula C Ruddock
*Assistant Examiner* — Daniel Gatewood
(74) *Attorney, Agent, or Firm* — Young Basile

(57) ABSTRACT

A fuel cell stack structure includes, for example, a plurality of unit cells each having an aperture formed therethrough. A first fuel cell stack is formed by stacking the plurality of unit cells in a stacking direction and has an internal manifold opening defined by the apertures. A fluid passage within the cell for flowing a fluid that flows within the internal manifold is configured and arranged to flow the fluid in a direction generally perpendicular to the stacking direction of the unit cell. The structure also includes an external manifold having an external passage for supplying the fluid to the internal manifold, wherein an external manifold surface facing a flow direction of the fluid creates a vortex in fluid flowing within the external passage proximal to the internal manifold.

19 Claims, 12 Drawing Sheets

FUEL CELL STACK STRUCTURE

CROSS-REFERENCE TO RELATED APPLICATIONS

This application claims priority from Japanese Patent Application Serial No. 2006-078958, filed Mar. 22, 2006, and No. 2007-014855, filed Jan. 25, 2007, each of which is incorporated herein in its entirety by reference.

TECHNICAL FIELD

The present invention relates to a fuel cell stack structure.

BACKGROUND

A conventional fuel cell includes a gas passage. The gas passage connects a supply pipe, which supplies a reaction gas to a fuel cell stack, to an internal manifold for distributing the reaction gas to each unit cell. In the gas passage, there is disposed a plate that extends parallel to a stacking direction of the unit cell. One drawback in such configurations is that the conventional fuel cell cannot always ensure a proper distribution of fluid flowing to each unit cell.

BRIEF SUMMARY OF THE INVENTION

Embodiments of a fuel cell stack structure are disclosed. One example of a fuel stack structure includes a plurality of unit cells, each having an aperture formed therethrough. A first fuel cell stack formed by stacking the plurality of unit cells in stacking direction has an internal manifold opening defined by the apertures and an in-cell fluid passage in fluid communication with the internal manifold. The in-cell fluid passage is configured and arranged to flow the fluid in a direction generally perpendicular to the stacking direction of the unit cells, and an external manifold has an external passage for supplying the fluid to the internal manifold. The external passage creates a vortex in the fluid proximal to the internal manifold by a surface opposing a flow direction.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Hereinafter, various embodiments of the fuel stack structure as disclosed herein will be described with reference to the accompanying drawings.

Figure 1:
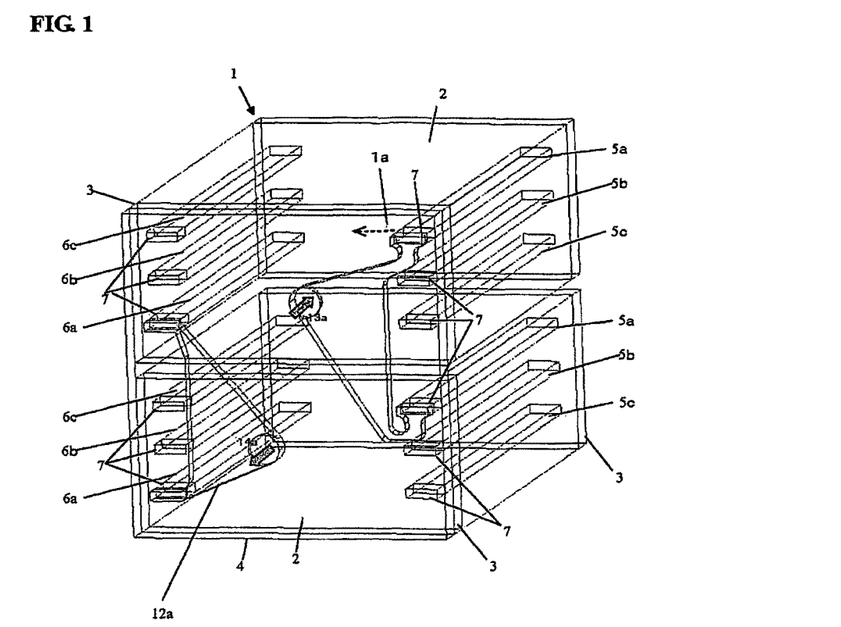
FIG. 1 is a perspective view illustrating a fuel cell and its fluid passage structure in accordance with a first embodiment of a fuel stack structure as disclosed herein.
Figure 16:
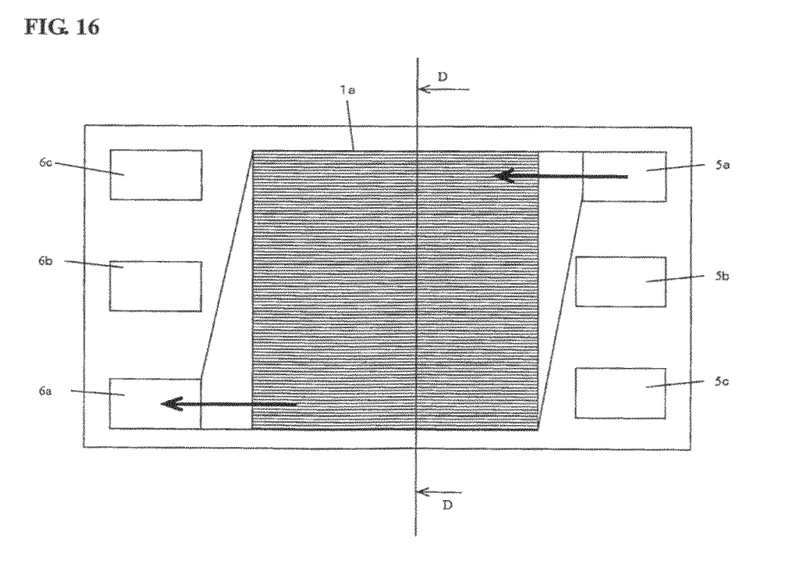
FIG. 16 is a diagram illustrating a separator in accordance with the disclosure.
Figure 17:
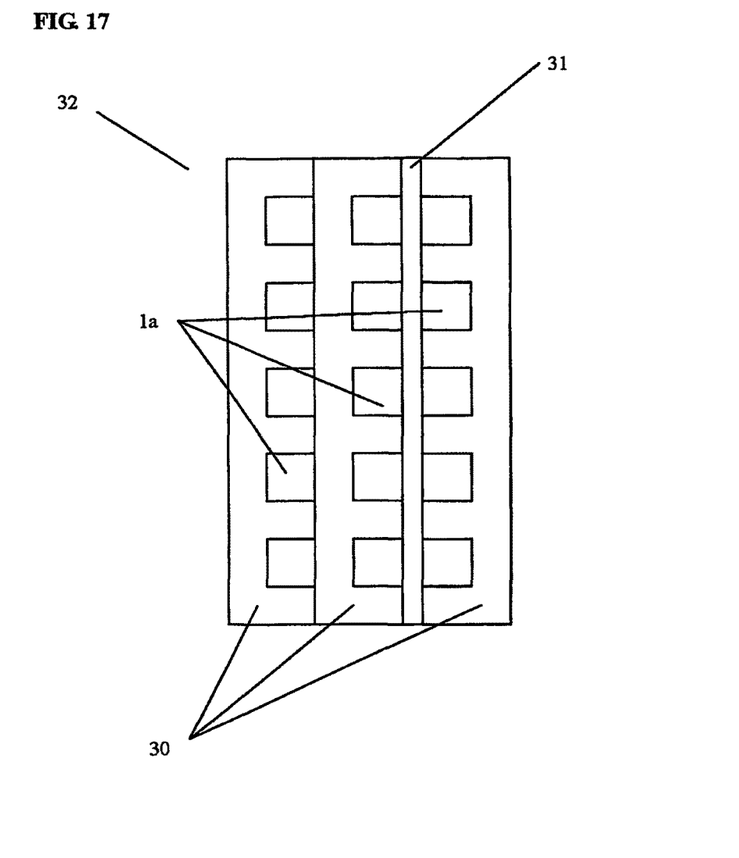
FIG. 17 is a cross-sectional view taken along line D-D shown in FIG. 16 illustrating a unit cell in accordance with the present disclosure.

FIG. 1 illustrates a fuel cell and its fluid passage structure in accordance with a first embodiment of the fuel cell stack structure as disclosed herein. A fuel cell 1 includes a stack body 2 formed by stacking a plurality of unit cells 32 (see FIG. 17) and respective end plates 3 for holding the stack body 2 from both ends thereof. The unit cell 32 is formed by placing separators 30 (see FIG. 16 and the cross-sectional view along line D-D in FIG. 17) for a fuel gas and an oxidizer gas facing each other through a membrane electrode assembly (MEA) 31 and stacking a separator 30 for cooling. In such a case, a plurality of fuel cells 1 are disposed within a case (not shown) containing, e.g., two-stages of upper and lower fuel cells 1. Further, a common manifold (external manifold) 4 is disposed at one end of upper and lower fuel cells 1.

The fuel cell stack structure as disclosed herein can prevent a flow separation when a fluid flowing from an external passage is directed to an internal manifold hole. Further, the fuel stack structure can also reduce a pressure loss. Thus, it is possible to improve the distribution amount of fluid flowing in a cell stacking direction within the internal manifold hole. As a result, generating performance bias among the cells in the stack can be eliminated to thereby improve a generating efficiency.

In the fuel cell 1, fluid supplying internal manifold holes 5a to 5c (to which a fuel gas, a coolant and an oxidizer gas are supplied, respectively) and fluid discharging internal manifold holes 6a to 6c (from which each fluid is discharged) pass through the unit cells 32 and the separators 30 constituting the stack body 2 in a stacking direction, respectively. Each fluid supplying manifold hole 5a to 5c communicates with each corresponding fluid discharging manifold hole 6a to 6c within a cell 32. Further, each fluid supplying manifold hole 5a to 5c is configured to allow the fluid to flow through in-cell fluid passages 1a separated from each other depending on the types of fluid.

An opening 7 that conforms to each internal manifold hole 5a to 5c and 6a to 6c is formed in the end plate 3 disposed at one end (an end disposed at a front side of the structure shown in the drawing) of the internal manifold holes 5a to 5c or 6a to 6c. Further, the manifold 4 is coupled to the end plate 3 to supply or discharge the fluid into or from each internal manifold hole 5a to 5c and 6a to 6c via each opening 7.

Figure 3:
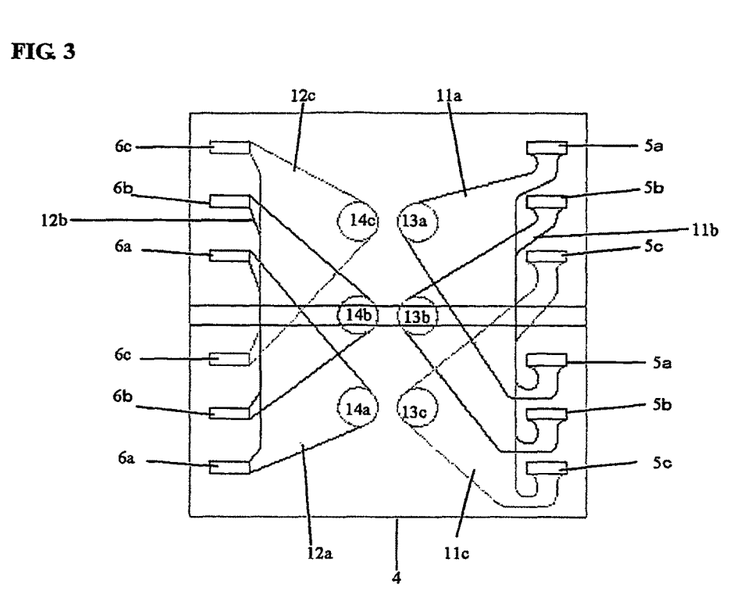
FIG. 3 is a front view illustrating a passage structure of a manifold in accordance with the first embodiment.

More specifically, and referring now to FIG. 3, the manifold 4 includes an inlet side external passage 11a and an outlet side external passage 12a for a fuel gas, an inlet side external passage 11b and an outlet side external passage 12b for a coolant, and an inlet side external passage 11c and an outlet side external passage 12c for an oxidizer gas. The inlets 13a to 13c and outlets 14a to 14c for each fluid are concentrated at respective points of the stack body 2 formed in two upper and lower stages. That is, the fluid supplying (inlet side) external passages 11a to 11c are configured to extend along a cell surface towards the opening of the internal manifold holes 5a to 5c of each stack body 2 from each inlet portion 13a to 13c and are bifurcated into two directions in the middle of the passages 11a to 11c. Further, the fluid discharging (outlet side) external passages 12a to 12c are configured to converge the internal manifold holes 6a to 6c for discharging two types of fluid into common outlet portions 14a to 14c. While being shown as overlapping in FIG. 3, the external passages 11a to 11c and 12a to 12c are formed so as not to interfere with each other within the manifold 4 through a core formation, etc.

Among various external passages 11a to 11c and 12a to 12c, FIG. 1 illustrates only the fuel gas supplying external passage 11a and the fuel gas discharging external passage 12a. Hereinafter, the characteristic features of the embodiment of the fuel cell stack structure will be explained by referring to the fuel gas supplying external passage 11a. In the embodiment shown in FIG. 2, when viewing the external passage 11a from an opening direction of the internal manifold hole 5a for a fuel gas, the directions of the external passage 11a and the in-cell fluid passage 1a are set such that a flowing line defined by the external passage 11a around the opening 7 and a flowing line defined by the in-cell fluid passage 1a around the internal manifold hole 5a cross approximately at a right angle. Further, a hatched portion in FIG. 2 indicates an opening for the in-cell fluid passage 1a of the internal manifold hole 5a.

Figure 2:
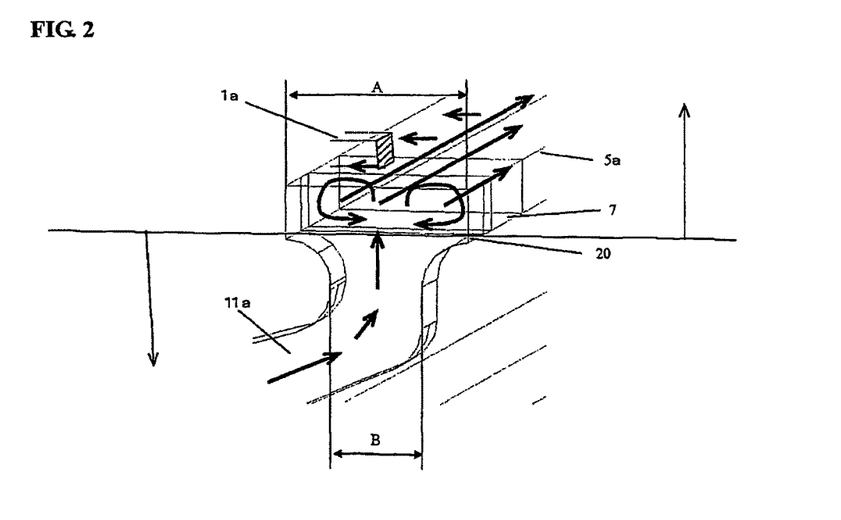
FIG. 2 is a diagram illustrating a vicinity for a connecting portion of an external passage and an internal manifold hole in accordance with the first embodiment.

Further, as shown, the internal manifold hole 5a and its opening 7 have a flat shape. More specifically, they are shaped in a transversely elongated rectangle. Also, the external passage 11a is oriented such that fluid exiting the passage 11a travels approximately at a right angle with the in-cell fluid passage 1a. Moreover, the in-cell fluid passage 1a is formed so as to open at its shorter side portion when viewed from the opening 7. Also, if a width of the longer side of the opening 7 is "A," and a width of the external passage 11a prior to the opening 7 is "B," then width A is set to be greater than width B (A>B) while a width of the passage 11a gradually increases towards a connecting portion 20 with the opening 7 from the portion of width B.

By forming the external passage 11a of the manifold 4 in such a configuration, when a fuel gas supplied to the external passage 11a via its inlet portion 13a flows into the internal manifold hole 5a, it flows without a velocity component in a direction of the in-cell fluid passage 1a. To this end, any bias of a back flow among the cells 32 that is caused by the velocity components around the opening 7 of the internal manifold hole 5a can be prevented. As such, the generating efficiency of the stack body 2 can be improved. Such an effect will be specifically explained hereinafter.

Figure 4:
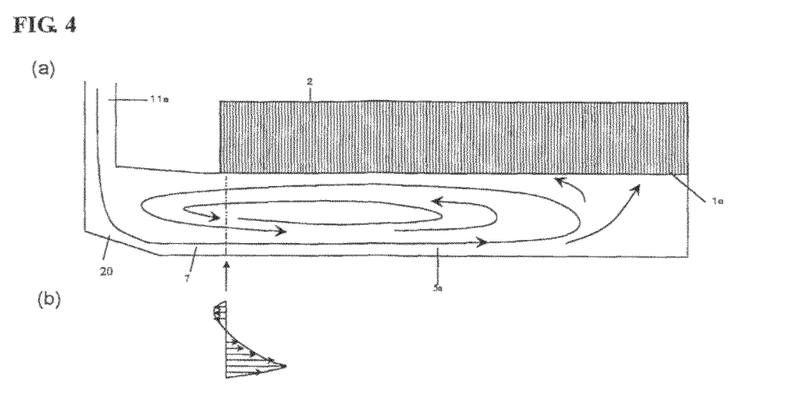
FIG. 4A is a diagram illustrating a flow direction of a fuel gas in a transverse section of an internal manifold in accordance with a comparative example.
FIG. 4B is a diagram illustrating a speed distribution of a fuel gas in a transverse section around an opening shown in FIG. 4A.

A shorter side of the connecting portion 20 of the internal manifold hole 5a may be connected to the in-cell fluid passage 1a in an approximately parallel direction. As shown in FIGS. 4A and 4B, the flow of a fuel gas flowing at a high speed (maximum flow speed ranges from 50 m/s to 100 m/s) changes its direction by 90 degrees in the connecting portion 20 so as to be biased to an outer side of the bend. As a result, such a flow is separated from an opening side wall surface of the in-cell fluid passage 1a upstream of the internal manifold hole 5a. Further, as shown in the drawings, a loop-back phenomenon occurs where downstream fuel gas of a low pressure flows backward in the in-cell fluid passage 1a.

FIG. 4B illustrates the speed distribution of the fuel gas in a transverse section of the internal manifold 5a around an inlet of the in-cell fluid passage 1a of the fuel cell disposed in an upstream position within the internal manifold hole 5a. When the loop-back phenomenon occurs, an opening of an in-cell fluid passage 1a located upstream of the internal manifold hole 5a is characterized by a lower pressure than an opening of an in-cell fluid passage 1a located downstream thereof. Due to such a pressure difference, the amount of fuel gas supplied to the upstream in-cell fluid passage 1a is less than that of the other portions of the in-cell fluid passage 1a.

Figure 6:
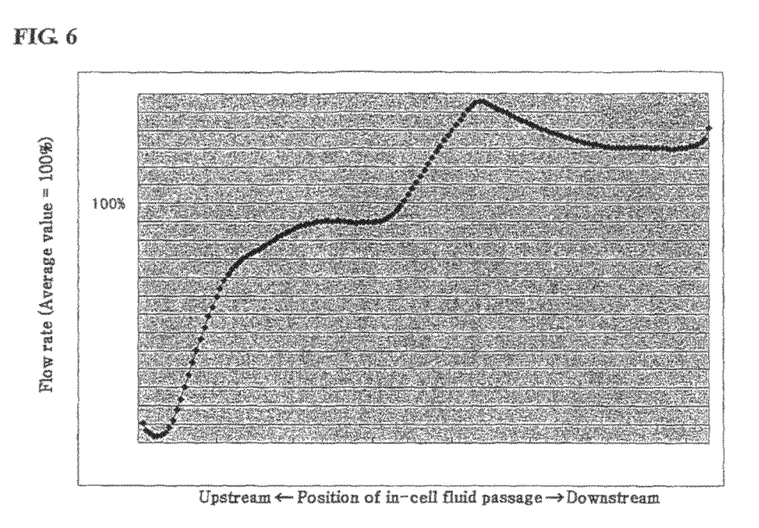
FIG. 6 is a diagram illustrating results of simulations showing a supply flow rate of a fuel gas to each cell in accordance with a comparative example.

Further, FIG. 6 illustrates the result of simulations that show the flow rate of fuel gas supply to each cell in the above case. As shown in FIG. 6, a significant bias occurs in the amount of fuel gas supplied to each cell constituting the stack body 2, wherein little fuel gas is supplied to the upstream side.

Figure 5:
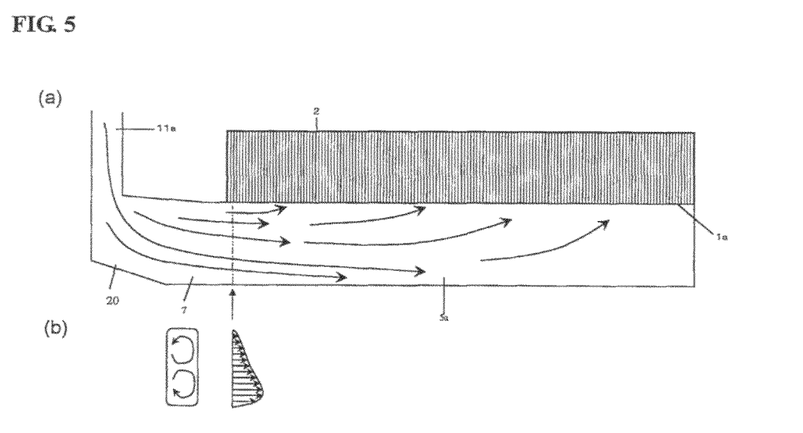
FIG. 5A is a diagram illustrating a flow direction of a fuel gas in a transverse section of an internal manifold in accordance with the first embodiment as disclosed herein.
FIG. 5B is a diagram illustrating a speed distribution of a fuel gas in a transverse section around an opening shown in FIG. 5A.

In addition, the internal manifold hole 5a may be formed to have a flat rectangular cross section. Further, the external passage 11a may be connected to the in-cell fluid passage 1a from a longer side of the connecting portion 20 of the internal manifold hole 5a in an approximately straight direction. As shown in FIGS. 5A and 5B, a shear flow (i.e., vortex) is formed by two high speed fluids confronting each other with opposite directions in narrow portions of transverse section of the connecting portion 20, the opening 7 and the upstream of the internal manifold hole 5a. That is, the flow of fuel gas in the internal manifold hole 5a has velocity components in a transverse direction. In such a flow passage structure, if a vortex is formed within the internal manifold hole 5a, then a pressure deviation within a transverse section surface becomes smaller. Accordingly, a pressure difference between the upstream and downstream of the internal manifold hole 5a where a loop-back phenomenon occurs is relieved. Alternatively, a vortex having one flow direction may be formed within the internal manifold hole 5a.

Figure 7:
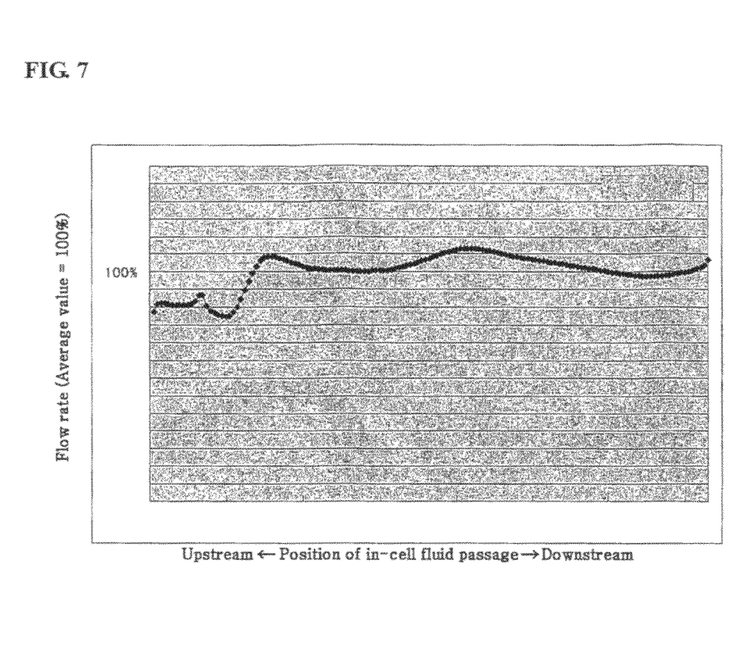
FIG. 7 is a diagram showing results of simulations showing a supply flow rate of a fuel gas to each cell in accordance with the first embodiment as disclosed herein.

Further, FIG. 7 illustrates the result of simulations that show the flow rate of fuel gas supply to each cell in the above case. As shown in FIG. 7, it is understood that the amount of fuel gas supplied to each cell constituting the stack body 2 is uniformly distributed.

Also, this embodiment has a configuration in which a width A of the connecting portion 20 of the external passage 11a and the internal manifold is greater than a flow passage width B of the external flow passage 11a. That is, the external passage 11a gradually expands for connection to the connecting portion 20. Accordingly, an intersecting line of the external passage 11a and a longer side of the connecting portion 20 has a smooth configuration. Also, the flow speed of fuel gas from the external passage 11a becomes stable. Additionally, a vortex within the internal manifold hole 5a becomes stable. As such, the pressure deviation within a transverse section of the internal manifold hole 5a becomes smaller. Further, fluid separation around the internal manifold hole 5a is restrained. Fluid separation around the internal manifold hole 5a may have an adverse effect upon a back flow among upstream cells. Thus, the uniformity of the back flow can be improved. To this end, the generating efficiency of the stack body 2 can be further improved.

Figure 8:
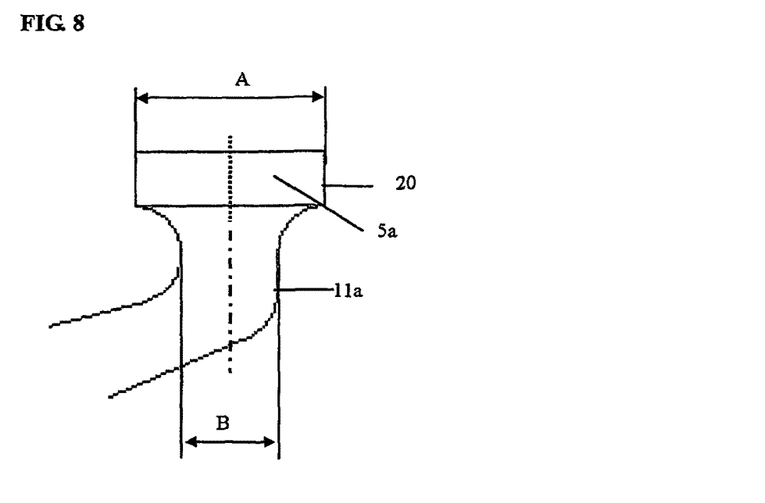
FIG. 8 is a diagram illustrating a vicinity around a connecting portion of an external passage and an internal manifold hole in accordance with the first embodiment as disclosed herein.

Further, as shown in FIG. 8, a centerline of the external fluid passage 11a (indicated by the dot and chain line) conforms to a centerline of a longer side of the connecting portion 20 (indicated by the dash line). As such, two vortexes are formed in balance within the internal manifold hole 5a and a pressure deviation within a transverse section surface of the internal manifold hole 5a becomes smaller. To this end, the generating efficiency of the stack body 2 can be further improved.

Figure 9:
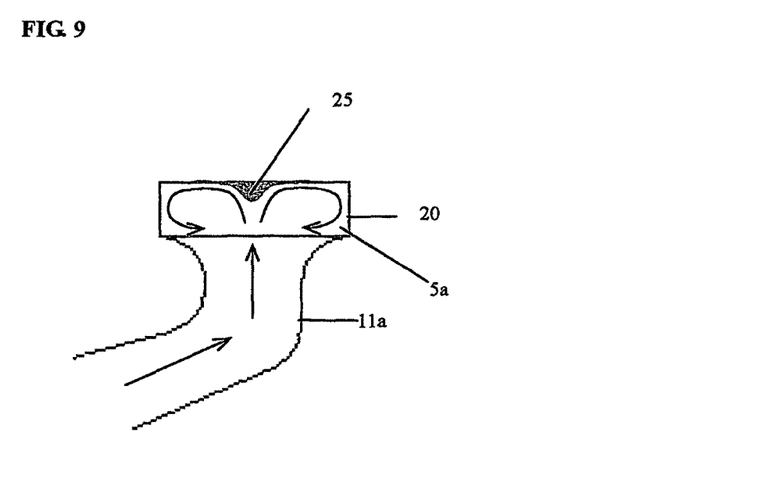
FIG. 9 is a diagram illustrating a convex portion in accordance with the first embodiment as disclosed herein.

Also, as shown in FIG. 9, a smooth convex portion 25 is disposed on a wall surface of a longer side of the connecting portion 20 where the fuel gas from the external fluid passage 11a changes its flow direction. As such, two vortexes are formed in balance within the internal manifold hole 5a, and a pressure deviation within a transverse section surface of the internal manifold hole 5a becomes smaller. To this end, the generating efficiency of the stack body 2 can be further improved.

Figure 10:
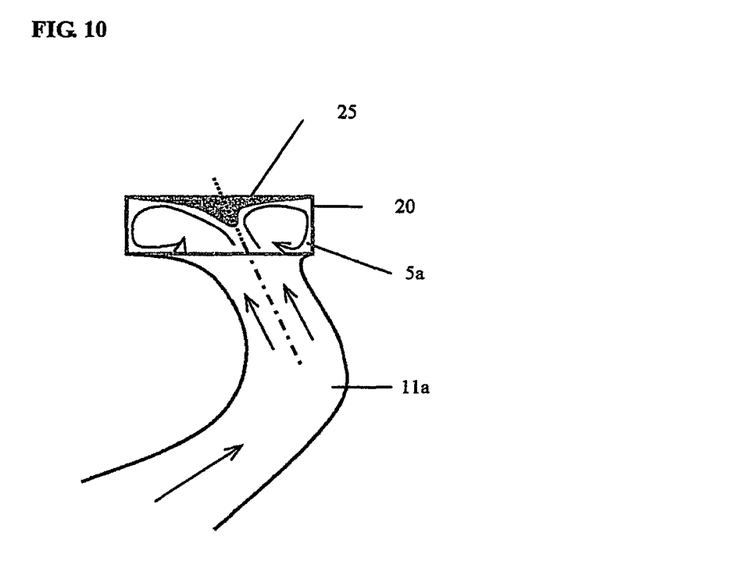
FIG. 10 is a diagram illustrating another configuration of a convex portion in accordance with the first embodiment as disclosed herein.

Further, as shown in FIG. 10, a centerline of the manifold external fluid passage 11a may be offset to the right or left from a centerline of a longer side of the connecting portion 20 due to a structural limitation of the manifold 4. In such a case, a centerline (indicated by the dash line) of a fore curved surface R of the convex portion 25 formed on a wall surface of a longer side of the connecting portion 20 (where the fuel gas from the external fluid passage 11a changes its flow direction) is conformed to a centerline (indicated by dot and chain line) of the manifold external fluid passage 11a. Accordingly, two vortexes are formed in balance within the internal manifold hole 5a. As such, a pressure deviation within a transverse section of the internal manifold hole 5a becomes smaller. To this end, the generating efficiency of the stack body 2 can be further improved.

Figure 11:
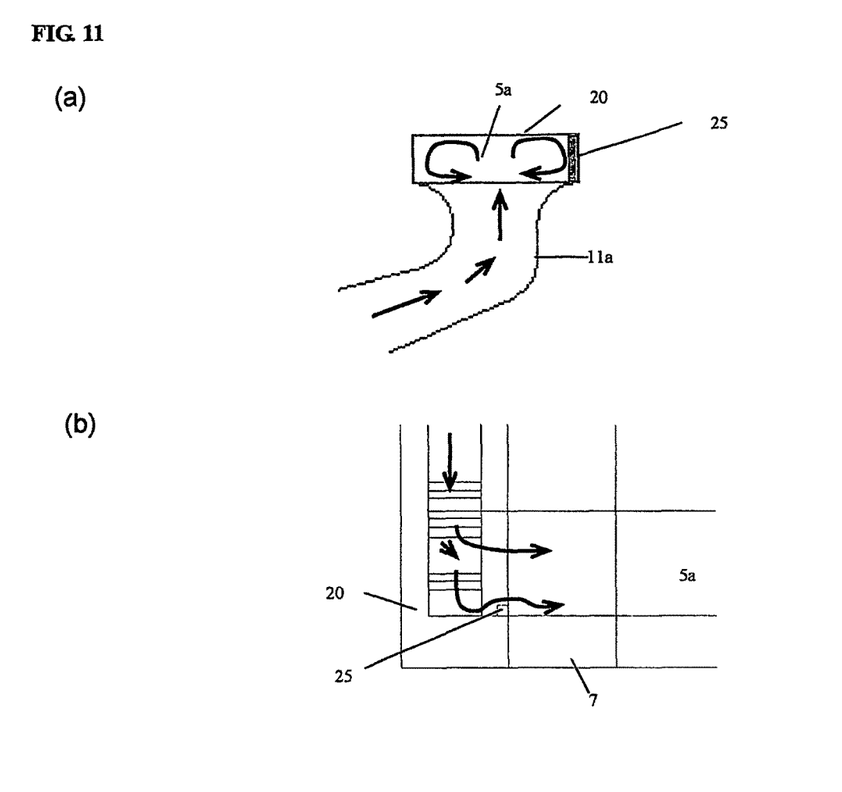
FIG. 11A is a diagram illustrating yet another configuration of a convex portion in accordance with the first embodiment as disclosed herein.
FIG. 11B is a diagram illustrating a transverse section shown in FIG. 11A.

Also, two vortexes, which are formed within the internal manifold hole 5a, may not be uniform. As such, a pressure deviation within the manifold hole 5a does not become smaller than a target value. In such a case, as shown in FIGS. 11A and 11B, the convex portion 25 is disposed on one of the two shorter sides of the external fluid passage connecting portion 20 (such as the right side of FIG. 11), specifically the side where the flow speed of fuel gas is greatest, thereby increasing viscosity resistance. That is, the kinetic energy of fluid at a high speed is transformed into heat energy due to the viscosity of the fluid such that the fuel gas flowing at a high speed is decelerated. As a result, the flow speed of the two vortexes is made uniform, thereby decreasing a pressure deviation within the transverse section surface.

Figure 12:
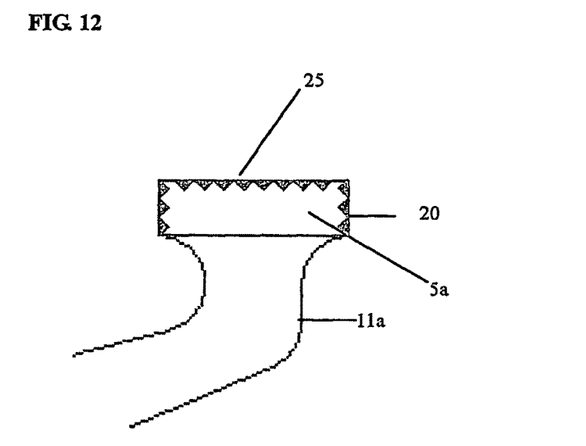
FIG. 12 is a diagram illustrating still yet another configuration of a convex portion in accordance with the first embodiment as disclosed herein.

Further, the external fluid passage connecting portion 20 and a thickness end plate opening 7 may be larger due to structural limitation(s). Also, the distance between two vortexes formed upstream of the internal manifold hole 5a can be extended such that the vortexes reach an in-cell fluid passage inlet 1a. In such a case, as shown in FIG. 12, a fine convex-concave portion 25 is formed on an entire surface of the connecting portion 20 where the fuel gas from the external fluid passage 11a changes its flow direction. Accordingly, the contact area of the vortex and the wall surface become smaller, and the amount of kinetic energy loss by viscosity friction is restrained. As a result, the distance between two vortexes becomes longer such that a pressure deviation within a transverse section around the in-cell fluid passage inlet 1a can become smaller.

Also, the cross-section of the internal manifold hole 5a can have a flat configuration. Further, the in-cell fluid passage 1a can open at a shorter side thereof. As such, the space becomes narrower where a fluid separation may occur at a deflecting point of a flow from the external passage 11a to the internal manifold hole 5a. To this end, even when the fluid separation occurs around the deflecting point, the range of such separation becomes smaller. To that extent, the fluid contact area with the opening of the in-cell fluid passage 1a can be secured, thereby increasing the uniformity of a back flow.

Figure 13:
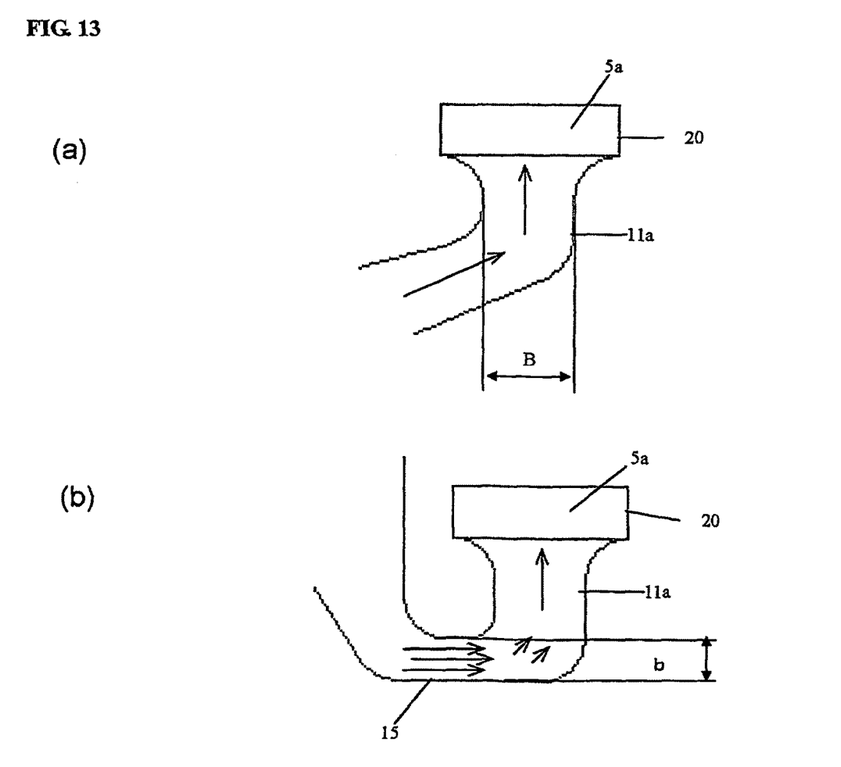
FIG. 13A is a front view illustrating an upper external passage structure in accordance with a second embodiment of the fuel stack structure as disclosed herein.
FIG. 13B is a front view illustrating a lower external passage structure in accordance with the second embodiment as disclosed herein.

FIGS. 13A and 13B show a second illustrative embodiment of the fuel cell stack structure as disclosed herein. In the manifold 4, the external passages 11a to 11c are connected to the internal manifold holes 5a to 5c, respectively, such that the fluid flows upward to the manifold hole. As such, as shown in FIG. 13B, the external passage 11a is bifurcated from a fluid inlet 13a and disposed lower than where the inlet portion is configured to be connected to the opening 7 via a thin portion 15. The thin portion 15 has a width "b," which is narrower than a width "B" of the (upper) external passage 11a (see FIG. 13A) disposed higher than the inlet portion. The minimum passage cross-sectional area of the thin portion 15 is smaller than that of the external passage 11a. As used herein, directional language is specified with respect to the general direction of gravitational force. In this paragraph, by example, "upward" and "higher" refer to a direction against the direction of gravitational force, while "lower" refers generally to the direction of gravitational force.

There may be difficulties in that water is condensed in the gas flowing in the external passage 11a disposed in a lower position. The condensed water obstructs the gas flow in the connecting portion 20. To solve such a problem, this embodiment may employ the thin portion 15 having a relatively small cross-sectional area. This is so that the gas flow speed in the thin portion 15 increases to prevent water from being condensed therein. As such, the pressure loss or back flow deterioration, which is caused by the condensed water, can be avoided.

Figure 14:
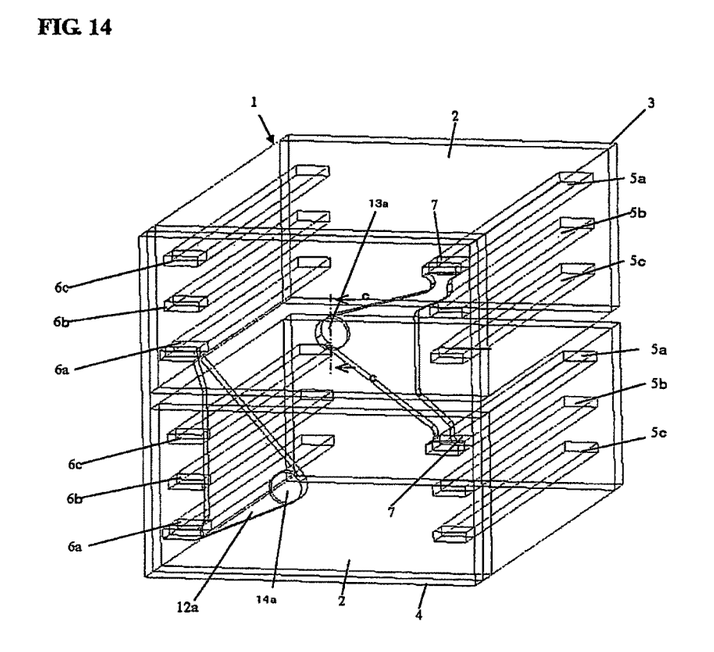
FIG. 14 is a perspective view illustrating a fuel cell and its fluid passage structure in accordance with the second embodiment as disclosed herein.

On the other hand, as shown in FIG. 14, a layout for forming an external passage 11a such that the fluid flows downward into the connecting portion 20 of the manifold hole may be applied to the internal manifold hole 5a for the fuel gas of the fuel cell 1 disposed at a lower end. As such, water is not condensed around the opening 7. Thus, the thin portion 15 does not necessarily have to be disposed therein.

Figure 15:
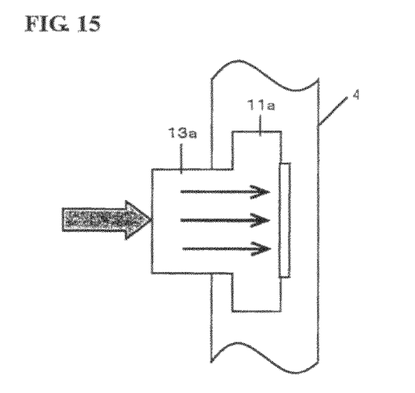
FIG. 15 is a longitudinal cross-sectional view illustrating a vicinity around an external fluid passage inlet portion in accordance with the second embodiment as disclosed herein.

Further, FIG. 15 illustrates a cross-sectional view of the external fluid passage inlet 13a taken from the line C-C shown in FIG. 14. As shown in FIG. 15, a plate-shaped heater 16 is disposed in a deflection region where the fuel gas flowing from the external fluid passage inlet 13a contacts a bottom surface of the manifold external fluid passage 11a to change its flowing direction by 90 degrees. As such, it is possible to increase the temperature at a region where the pressure of the fuel gas is high and water is easily condensed. This effectively prevents the water from being condensed therein. Also, the same effect can be obtained by disposing a heat insulating material (e.g., wool) having a low heat conductivity as well as water absorbing and moisture dissipating properties on the entire bottom surface of the external fluid passage 11a.

Further, the constitutions and technical effects of the illustrative embodiments have been explained above with respect to the exemplary external passage 11a and the internal manifold hole 5a for a fuel gas. However, it should be understood that such technical effects could be also obtained when employing the same constructions with respect to the external passages 11b and 11c and the internal manifold holes 5b and 5c for a coolant or an oxidizer gas.

Accordingly, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A fuel cell stack structure, comprising:
   a plurality of unit cells, each having an aperture formed therethrough;
   a first fuel cell stack formed by stacking the plurality of unit cells in a stacking direction, the first fuel cell stack having an internal manifold opening defined by the apertures of the plurality of unit cells, the internal manifold opening in communication with an internal manifold;
   an in-cell fluid passage in fluid communication with the internal manifold, the in-cell fluid passage configured and arranged to flow fluid in a direction generally perpendicular to the stacking direction of the unit cell;
   an external manifold having an external passage for supplying the fluid to the internal manifold, the external passage having a connection portion to connect the external passage to the internal manifold; and
   a convex surface protruding from an interior surface of the connecting portion, wherein the convex surface is configured to create a vortex in the fluid proximal to the internal manifold.

2. The fuel cell stack structure of claim 1, wherein the internal manifold opening has a rectangular cross-sectional shape having a shorter side and a longer side and the in-cell fluid passage is fluidly coupled with the shorter side of the internal manifold opening, and wherein the external passage is fluidly coupled with the longer side of the internal manifold opening.

3. The fuel cell stack structure of claim 1, wherein a width of the external passage increases gradually towards the connection portion with the internal manifold opening.

4. The fuel cell stack structure of claim 3, further comprising:
   an inlet for supplying the fluid to the external manifold, wherein the external passage is connected upward to the internal manifold opening and the inlet is disposed at a lower position than the internal manifold opening.

5. The fuel cell stack structure of claim 4, further comprising:
   a second fuel cell stack in a position above the first fuel cell stack;
   an upper side opening positioned above the inlet; and
   an upper side external passage connecting the inlet and the upper side opening, wherein a minimum passage cross-sectional area of the external passage is smaller than a minimum passage cross-sectional area of the upper side external passage.

6. The fuel cell stack structure of claim 1, further comprising:
   an inlet for supplying the fluid to the external manifold, wherein the external passage is connected below the internal manifold opening and the inlet is disposed at a position higher than the internal manifold opening.

7. The fuel cell stack structure of claim 2, wherein the flow direction of the fluid flowing from the external passage to the internal manifold is perpendicular to the longer side of the internal manifold opening, and wherein the external passage is connected to the internal manifold such that a centerline of a width of the external passage conforms to a centerline of a longer side direction of the internal manifold opening.

8. The fuel cell stack structure of claim 1, wherein the convex portion has an apex projecting in a direction aligned with a centerline of a width of the external passage.

9. The fuel cell stack structure of claim 2, wherein the connecting portion has two shorter sides, and wherein the convex portion projects from one of the shorter sides of the connecting portion where a flow speed is faster than the other of the shorter sides.

10. The fuel cell stack structure of claim 1, further comprising:
    an inlet for supplying the fluid to the external manifold; and
    a heater on a surface of the external passage facing the inlet.

11. The fuel cell stack structure of claim 1, further comprising:
    a heat insulating material on a surface of the external passage.

12. A fuel cell stack structure, comprising: a plurality of unit cells, each having an aperture formed therethrough; a fuel cell stack formed by stacking the plurality of unit cells in a stacking direction, the fuel cell stack having an internal manifold opening defined by the apertures of the plurality of unit cells;
    an in-cell fluid passage in fluid communication with an internal manifold in the stacking direction of the unit cell; and
    an external manifold having an external passage for supplying fluid to the internal manifold, the external passage having a connecting portion to connect the external passage to the internal manifold,
    wherein a surface of the connecting portion creates an angle of approximately 90 degrees with an adjacent surface, causing a flow direction of the fluid flowing into the connecting portion to be substantially perpendicular to fluid flowing in the internal manifold opening; and
    further comprising at least one of:
    a convex portion on an inner circumference of an opening of the connection of the external passage and the internal manifold; and
    a convex portion on one of two shorter sides of the connection of the external passage and the internal manifold where a flow speed is faster than the other of the shorter sides.

13. The fuel stack structure of claim 12 wherein a width of the external passage increases gradually towards a connection with the internal manifold opening.

14. The fuel cell stack structure of claim 12, further comprising:
    an inlet for supplying the fluid to the external manifold, wherein the external passage of the external manifold is connected upward to the internal manifold opening and the inlet is disposed at a lower position than the internal manifold opening.

15. The fuel cell stack structure of claim 14, further comprising:
a second fuel cell stack in a position above the fuel cell stack;
an upper side opening disposed at an upper position of the inlet corresponding to the upper position of the fuel cell stack; and
an upper side external passage connecting the inlet and the upper side opening, wherein a minimum passage cross-sectional area of the external passage is smaller than a minimum passage cross-sectional area of the upper side external passage.

16. The fuel cell stack structure of claim 14 wherein a flow direction of the fluid flowing from the external passage to the internal manifold is perpendicular to a longer side of the internal manifold opening, and wherein the external passage is connected to the internal manifold such that a centerline of a width of the external passage conforms to a centerline of a longer side direction of the internal manifold opening.

17. The fuel cell stack structure of claim 12, further comprising:
an inlet for supplying the fluid to the external manifold; and
a heater on a bottom surface of the external passage facing the inlet.

18. A fuel cell stack structure, comprising:
a plurality of unit cells, each having apertures formed therethrough;
a fuel cell stack formed by stacking the plurality of unit cells in a stacking direction, the fuel cell stack having an internal manifold opening formed by communicating the openings of the plurality of unit cells;
an in-cell fluid passage in fluid communication with an internal manifold in a stacking direction of the unit cell;
an external manifold having an external passage for supplying fluid to the internal manifold; and
at least one of:
a convex portion on an inner circumference of an opening of a connecting portion of the external passage and the internal manifold; and
a convex portion on one of two shorter sides of the connecting portion where a flow speed is faster than the other of the two shorter sides;
wherein the internal manifold opening has a rectangular shape and the in-cell fluid passage communicates with a shorter side of the internal manifold opening, and wherein the external passage is connected to a longer side of the internal manifold opening; and
wherein a surface of the connecting portion creates an angle of approximately 90 degrees with an adjacent surface, causing a flow direction of the fluid flowing into the connecting portion to be substantially perpendicular to fluid flowing in the internal manifold opening.

19. The fuel cell stack structure of claim 1, wherein a surface of the connecting portion creates an angle of approximately 90 degrees with an adjacent surface, causing a flow direction of the fluid flowing into the connecting portion to be substantially perpendicular to fluid flowing in the internal manifold opening.

* * * * *